United States Patent
Hwang (10) Patent No.: US 12,086,630 B2
(45) Date of Patent: Sep. 10, 2024

(54) METHOD AND SYSTEM FOR GENERATING AND MANAGING SMART CONTRACT

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 18/130,145

(22) Filed: Apr. 3, 2023

(65) Prior Publication Data

US 2023/0325233 A1  Oct. 12, 2023

(30) Foreign Application Priority Data

Apr. 7, 2022  (KR) .................. 10-2022-0043139
Mar. 10, 2023  (KR) .................. 10-2023-0031592

(51) Int. Cl.
| | |
|---|---|
| *G06F 40/56* | (2020.01) |
| *G06F 9/48* | (2006.01) |
| *G06F 16/33* | (2019.01) |
| *G06F 40/12* | (2020.01) |
| *G06F 40/40* | (2020.01) |
| *G06F 9/46* | (2006.01) |
| *G06F 16/332* | (2019.01) |
| *G06F 40/20* | (2020.01) |
| *H04L 9/00* | (2022.01) |
| *H04L 9/32* | (2006.01) |

(52) U.S. Cl.
CPC ............ *G06F 9/4868* (2013.01); *G06F 9/466* (2013.01); *G06F 16/3329* (2019.01); *G06F 40/20* (2020.01); *G06F 40/56* (2020.01); *H04L 9/3236* (2013.01); *H04L 9/50* (2022.05)

(58) Field of Classification Search
CPC ......... G06F 9/4868; G06F 9/466; G06F 40/56
See application file for complete search history.

(56) References Cited

U.S. PATENT DOCUMENTS

| | | | |
|---|---|---|---|
| 10,521,505 B2* | 12/2019 | Anderson | H04L 9/3239 |
| 11,393,024 B1* | 7/2022 | Kodihalli | G06Q 40/03 |
| 2018/0005186 A1* | 1/2018 | Hunn | G06F 16/219 |
| 2018/0234240 A1* | 8/2018 | Ashley | G06F 21/60 |
| 2020/0082391 A1* | 3/2020 | Androulaki | G06Q 20/382 |
| 2020/0151842 A1* | 5/2020 | O'Brien | G07F 17/3276 |

(Continued)

FOREIGN PATENT DOCUMENTS

KR  10-2020-0094983 A  8/2020

OTHER PUBLICATIONS

Daniele Magazzeni et al., Validation and Verification of Smart Contracts: A Research Agenda, 2017, [Retrieved on Sep. 28, 2023]. Retrieved from the internet: <URL: https://ieeexplore.ieee.org/stamp/stamp.jsp?arnumber=8048663> 8 Pages (1-8) (Year: 2017).*

(Continued)

*Primary Examiner* — Anibal Rivera
(74) *Attorney, Agent, or Firm* — ArentFox Schiff LLP; Joseph M. Maraia; Marlo Schepper Grolnic (57) ABSTRACT

Methods of and systems for generating and managing a smart contract may include obtaining contents related to a contract at user request timing in a dialogue environment between users, generating at least one condition associated with the contract, generating a smart contract for the contents related to the contract and the generated condition, and storing the smart contract in a blockchain.

12 Claims, 9 Drawing Sheets

(56) References Cited

U.S. PATENT DOCUMENTS

| | | | | |
|---|---|---|---|---|
| 2020/0235947 | A1* | 7/2020 | Baykaner | H04L 9/3236 |
| 2020/0252205 | A1* | 8/2020 | Padmanabhan | G06F 9/466 |
| 2020/0320518 | A1* | 10/2020 | Simas | H04L 51/52 |
| 2021/0075610 | A1* | 3/2021 | Covaci | H04W 12/04 |
| 2021/0176276 | A1* | 6/2021 | Kursun | H04L 63/04 |
| 2021/0264520 | A1* | 8/2021 | Cummings | G06Q 40/12 |
| 2021/0273992 | A1* | 9/2021 | Kochura | H04L 9/3239 |
| 2021/0397732 | A1* | 12/2021 | Muddle | G06F 21/6227 |
| 2022/0156837 | A1* | 5/2022 | Malik | H04L 63/12 |
| 2022/0292268 | A1* | 9/2022 | Shillingford | G06F 16/313 |
| 2023/0177625 | A1* | 6/2023 | Dickerson | G06Q 50/18 |
| | | | | 705/80 |
| 2023/0281688 | A1* | 9/2023 | Errama | G06Q 30/0603 |
| | | | | 705/69 |

OTHER PUBLICATIONS

Kritagya Upadhyay et al., Paradigm Shift from Paper Contracts to Smart Contracts, 2021 IEEE, [Retrieved on Sep. 28, 2023]. Retrieved from the internet: <URL: https://ieeexplore.ieee.org/stamp/stamp.jsp?tp=&arnumber=9750226> 8 Pages (261-268) (Year: 2021).*

Svetislav Simici et al., Smart Contract and Blockchain Based Contract Management System, May 26-27, 2021, [Retrieved on 2024- 03-28]. Retrieved from the internet: <URL: https://dl.acm.org/doi/pdf/10.1145/3459960.3459975> 8 Pages (1-8) (Year: 2021).*

\* cited by examiner

METHOD AND SYSTEM FOR GENERATING AND MANAGING SMART CONTRACT

CROSS-REFERENCES TO RELATED APPLICATIONS

This application is based on and claims priority under 35 U.S.C. 119 to Korean Patent Application No. 10-2022-0043139, filed on Apr. 7, 2022 and Korean Patent Application No. 10-2023-0031592, filed on Mar. 10, 2023 in the Korean intellectual property office, the disclosures of which are herein incorporated by reference in their entireties.

TECHNICAL FIELD

The following description relates to a technology using a smart contract.

BACKGROUND OF THE DISCLOSURE

The blockchain technology is a technology for jointly managing specific data or a digital transaction ledger by distributing and storing the specific data or the digital transaction ledger in multiple participation nodes not a centralized server.

That is, the blockchain technology is a technology for preventing the forgery and alteration of corresponding information in a way to share, distribute, and store information, not a way to block access to information.

For example, Korean Patent Application Publication No. 10-2020-0094983 (laid open on Aug. 10, 2020) discloses a technology for processing an electronic contract in a blockchain environment.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As a base technology for a mutual agreement between members of blockchain-based decentralized autonomous organization (DAO), there is provided a technology capable of more easily generating a smart contract of a user and managing the smart contract on a blockchain in order to use the smart contract.

There is provided a technology capable of designating and managing for connecting trusted data to a smart contract.

In an embodiment, a method being performed by a computer device includes obtaining, by at least one processor included in the computer device, contents related to a contract at user request timing in a dialogue environment between users, generating, by the at least one processor, a smart contract for the contents related to the contract, and storing, by the at least one processor, the smart contract in a blockchain.

According to an aspect, generating the smart contract may include converting the contents related to the contract in a programmatic form through natural language processing (NLP).

According to another aspect, generating the smart contract may include generating the smart contract, based on data that has been changed or verified through an artificial intelligence (AI) model, with respect to the contents related to the contract.

According to still another aspect, a plurality of contract types may be managed in a template form. Generating the smart contract may include generating the smart contract in the template form selected with respect to the contents related to the contract.

According to still another aspect, storing the smart contract may include storing the smart contract in a blockchain designated by the user or a blockchain associated with the dialogue environment.

According to still another aspect, the method may further include managing and monitoring, by the at least one processor, a blockchain node in which the smart contract has been stored. Managing and monitoring the blockchain may include recording error information of the blockchain node on the smart contract.

According to still another aspect, obtaining the contents may include verifying the contents related to the contract through interoperation with an Oracle™ system.

According to still another aspect, verifying the contents related to the contract may include reading the contents related to the contract from a real world system of the dialogue environment through at least one of a data application programming interface (API) and data crawling.

According to still another aspect, verifying the contents related to the contract may include providing at least one of a certification function for data that is read through Oracle™, a cryptographic function for data that are transmitted and received through Oracle™, a trust verification function for data that is received through Oracle™, and a network security setting function between a data collection point and Oracle™, as a function for the trust of the data collection point.

According to still another aspect, the method may further include managing, by the at least one processor, Oracle™ that interoperates with the smart contract. Managing the Oracle™ may include monitoring service quality according to a use of the Oracle™ and determining whether to use the Oracle™ based on a result of the monitoring.

In an embodiment, there is provided a computer program stored in a computer-readable recording medium in order to execute the method in a computer device.

In an embodiment, a computer device includes at least one processor configured to execute computer-readable instructions included in memory. The at least one processor processes a process of obtaining contents related to a contract at user request timing in a dialogue environment between users, a process of generating a smart contract for the contents related to the contract, and a process of storing the smart contract in a blockchain.

According to embodiments of the present disclosure, a smart contract can be used as a base technology for a mutual agreement between members of blockchain-based DAO, through the technology for more easily generating a smart contract of a user and managing the smart contract on a blockchain and the technology for designating and managing Oracle™ for connecting trusted data to a smart contract.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, embodiments are described in detail with reference to the accompanying drawings.

Embodiments of the present disclosure relate to a technology using a smart contract in a blockchain-based decentralized autonomous organization (DAO) environment.

Embodiments including contents that are specifically disclosed in this specification may include a technology for more easily generating and managing a smart contract of a user and a technology for connecting trusted data to the smart contract, as a technology for using the smart contract.

A smart contract management system according to embodiments of the present disclosure may be implemented by at least one computer device. A smart contract management method according to embodiments of the present disclosure may be performed through at least one computer device that is included in the smart contract management system. In this case, a computer program according to an embodiment of the present disclosure may be installed and driven in the computer device. The computer device may perform the smart contract management method according to embodiments of the present disclosure under the control of the driven computer program. The computer program may be stored in a computer-readable recording medium in order to perform the smart contract management method in a computer in combination with the computer device.

Figure 1:
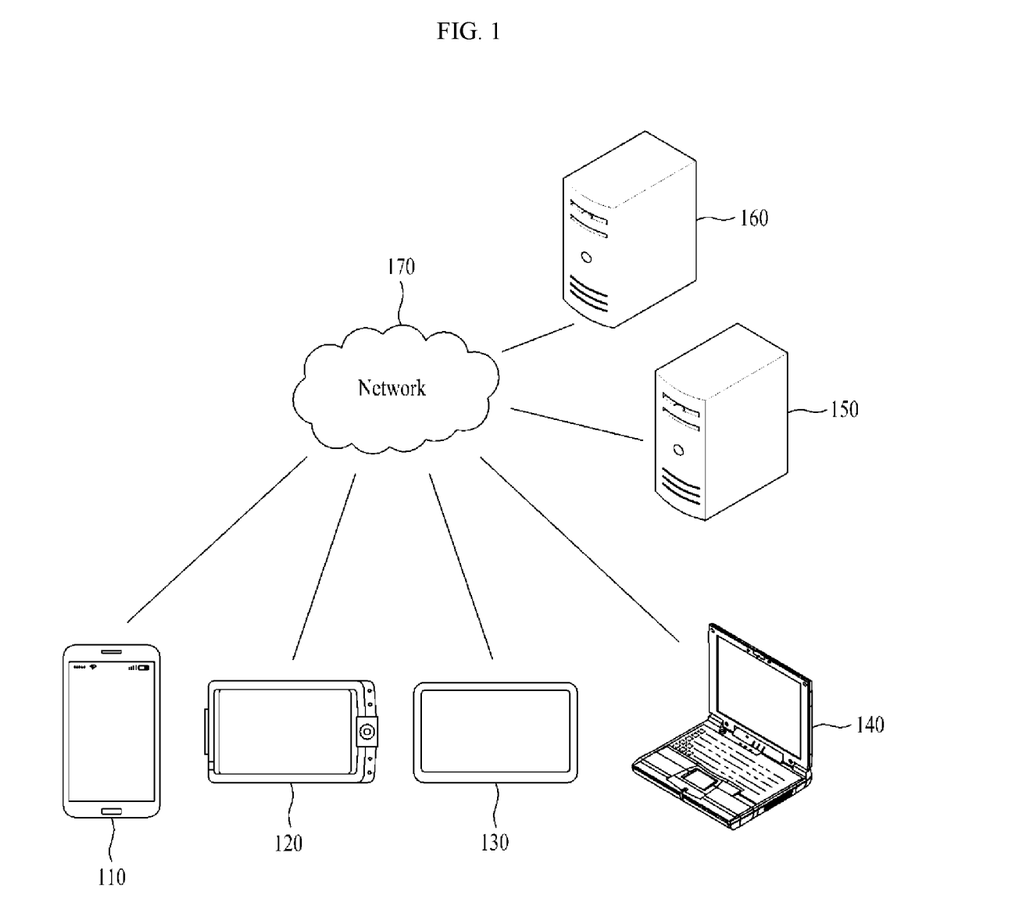
FIG. 1 is a diagram illustrating an example of a network environment according to an embodiment of the present disclosure.

FIG. 1 is a diagram illustrating an example of a network environment according to an embodiment of the present disclosure. The network environment of FIG. 1 illustrates an example including a plurality of electronic devices 110, 120, 130, and 140, a plurality of servers 150 and 160, and a network 170. FIG. 1 is an example for describing the present disclosure, and the number of electronic devices or the number of servers is not limited to that of FIG. 1. Furthermore, the network environment of FIG. 1 merely describes one of environments applicable to the present embodiments, and an environment applicable to the present embodiments is not limited to the network environment of FIG. 1.

Each of the plurality of electronic devices 110, 120, 130 and 140 may be a stationary terminal or a mobile terminal implemented as a computer device. For example, the plurality of electronic devices 110, 120, 130 and 140 may include a smartphone, a mobile phone, a navigation device, a computer, a laptop computer, a device for digital broadcasting, personal digital assistants (PDA), a portable multimedia player (PMP), a tablet personal computer (PC), etc. For example, in FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over the network 170 substantially using a wireless or wired communication method.

The communication method is not limited, and may include short-distance wired/wireless communication between devices, in addition to communication methods using communication networks (e.g., a mobile communication network, wired Internet, wireless Internet, and a broadcasting network) which may be included in the network 170. For example, the network 170 may include one or more arbitrary networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices, which provides an instruction, a code, a file, content, or a service through communication with the plurality of electronic devices 110, 120, 130 and 140 over the network 170. For example, the server 150 may be a system that provides a service (e.g., a blockchain-based contract service) to the plurality of electronic devices 110, 120, 130, and 140 connected through the network 170.

Figure 2:
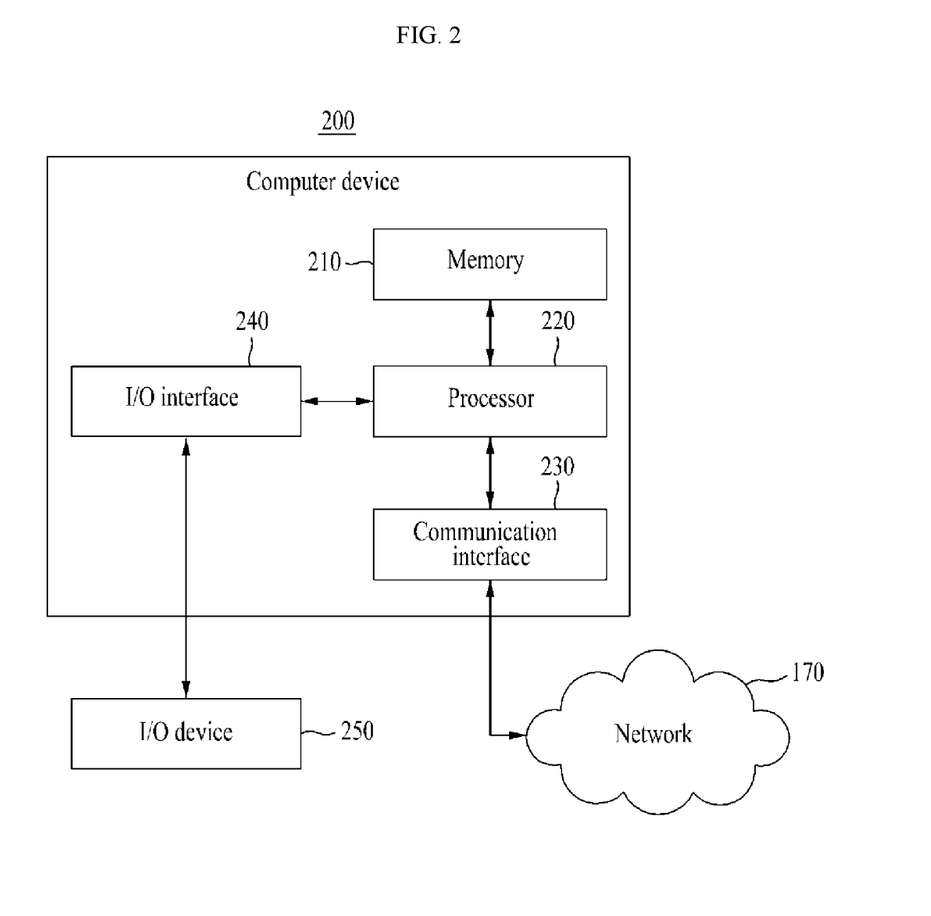
FIG. 2 is a block diagram illustrating an example of a computer device according to an embodiment of the present disclosure.

FIG. 2 is a block diagram illustrating an example of a computing device according to an embodiment of the present disclosure. Each of the plurality of electronic devices 110, 120, 130 and 140 or each of the servers 150 and 160 may be implemented as a computer device 200 illustrated in FIG. 2.

As illustrated in FIG. 2, the computer device 200 may include a memory 210, a processor 220, a communication interface 230 and an input/output (I/O) interface 240. The memory 210 is a computer-readable recording medium, and may include permanent mass storage devices, such as random access memory (RAM), read only memory (ROM) and a disk drive. In this case, the permanent mass storage device, such as ROM and a disk drive, may be included in the computer device 200 as a permanent storage device separated from the memory 210. Furthermore, an operating system and at least one program code may be stored in the memory 210. Such software components may be loaded onto the memory 210 from a computer-readable recording medium separated from the memory 210. Such a separate computer-readable recording medium may include computer-readable recording media, such as a floppy drive, a disk, a tape, a DVD/CD-ROM drive, and a memory card. In another embodiment, software components may be loaded onto the memory 210 through the communication interface 230 not a computer-readable recording medium. For example, the software components may be loaded onto the memory 210 of the computer device 200 based on a computer program installed by files received over the network 170.

The processor 220 may be configured to process instructions of a computer program by performing basic arithmetic, logic, and input/output (I/O) operations. The instructions may be provided to the processor 220 by the memory 210 or the communication interface 230. For example, the processor 220 may be configured to execute received instructions based on a program code that has been stored in a recording device, such as the memory 210.

The communication interface 230 may provide a function for enabling the computer device 200 to communicate with other devices over the network 170. For example, a request, an instruction, data, or a file that is generated by the processor 220 of the computer device 200 based on a program code that has been stored in a recording device, such as the memory 210, may be transferred to other devices over the network 170 under the control of the communication interface 230. Inversely, a signal, an instruction, data, or a file from another device may be received by the computer device 200 through the communication interface 230 of the computer device 200 over the network 170. A signal, an instruction, a file that is received through the communication interface 230 may be transmitted to the processor 220 or the memory 210. A file that is received through the communication interface 230 may be stored in a storage medium (e.g., the aforementioned permanent storage device) which may be further included in the computer device 200.

The I/O interface 240 may be means for an interface with an I/O device 250. For example, the input device may include a device, such as a microphone, a keyboard, or a mouse. The output device may include a device, such as a display or a speaker. Furthermore, for example, the I/O interface 240 may be means for an interface with a device in which functions for an input and an output have been integrated into one, such as a touch screen. At least one of the I/O devices 250, together with the computer device 200, may be configured as one device. For example, a touch screen, a microphone, and a speaker may be implemented in a form in which the touch screen, the microphone, and the speaker are included in the computer device 200 like a smart phone.

Furthermore, in other embodiments, the computer device 200 may include components greater or smaller than the components of FIG. 2. However, it is not necessary to clearly illustrate most of conventional components. For example, the computer device 200 may be implemented to include at least some of the I/O devices 250 or may further include other components, such as a transceiver and a database.

It is expected that decentralized autonomous organization (DAO) using a blockchain will be expanded. Accordingly, a key role in a DAO environment is a mutual agreement between members. It is expected that a smart contract (SC) will be widely used as a base technology for the mutual agreement.

For example, there are examples of various contracts that are performed in a Metaverse environment.

For example, if a sample course is taken in a painting class in Metaverse and an actual course is to be subsequently applied by one month or a predetermined number, an SC for applying for a course of a corresponding class through a voice, not writing a course application through a separate user interface (UI), may be generated. In this case, a course condition may be defined in the SC by using natural language processing (NLP) or may be set in the SC by using a template. A contract of the SC is performed in a form that is subtracted when a corresponding course is performed.

Furthermore, if information of a specific product is checked and the information is to be directly purchased as a physical product in a Metaverse store, a buyer may check the information of the corresponding product within Metaverse, and may check the quality of the product by including the product in order information. The corresponding order is generated in an SC form. If the buyer is not satisfied with the product that has been received, the buyer may identify whether the information of the purchased product in Metaverse and information of an actual product are identical with each other based on information on the SC.

The SC may convert a clause in a common contract into a programmatic form, and may set a proper input for the clause.

In the case of fully digital transaction, programmatic processing through an SC is easy. In the case of most of phenomena or events in the real world, however, there is a technical limitation in processing the phenomena or events by connecting the phenomena or events to an SC due to their analog properties.

Accordingly, there is a need for a method capable of processing a contract in the real world by using an SC.

In the present embodiment, an SC of a user can be generated more easily, and can be managed on a blockchain. For example, the processor 220 may generate an SC based on a natural language. A description function, together with a function for converting a contract form that is told in a natural language into a programmatic condition that is executable on an SC by using NLP, may be provided so that a common user can understand the function for converting a contract form. As another example, the processor 220 may select and use an SC having a template form. There is provided a function capable of using contents according to a form of transactions in the transactions of a user, through a method of registering the contents in the template form and of allowing common users to select templates suitable for the users by searching for a condition. Contracting parties may store an SC based on a natural language or a template in a desired blockchain, and may use the SC. In this case, the processor 220 may provide a function for generating and managing pieces of connection information for registering the SC written or selected by the contracting parties with various blockchains that are actually operated and for using the SC. Furthermore, the processor 220 may provide a function for managing an overall lifecycle of an SC, such as the change and stop of contents of an SC according to the requirements of contracting parties.

Furthermore, in the present embodiment, trusted data may be connected to an SC that is generated based on a natural language or a template. The processor 220 may provide a function capable of designating and managing mutual trustable Oracle™ for an SC. In this case, a condition or a periodic data transmission function may be set in Oracle™. Furthermore, the processor 220 may support a trusted connection from a data generation & capture point to an Oracle™ (i.e., data acquisition) point. The trust of data through encryption in an association interval up to Oracle™ can be secured in addition to trust at timing at which data is generated and obtained at a real world data collection point. The processor 220 may support a method of obtaining and associating data based on a contract with a data association point, such as an authorized organization/data supply provider.

The present embodiment provides an Oracle™ platform capable of providing trust in a data lifecycle aspect.

The Oracle™ platform according to the present disclosure provides a trust provision method for a process from a data generation and capture point to the time when the acquisition of data is performed through the Oracle™ system. To this end, association with a CPS (virtual physical system)/ Internet of Things (IoT) technology is possible. Technologies, such as the trust of a device, the security of a network section, and encryption of data, may be used. Furthermore, in order to avoid the ambiguity of NLP, changed and verified data may be used as an input value by using AI not a direct language of a user. In this case, AI having an available form may include discriminative model.

Furthermore, the Oracle™ platform according to the present disclosure can guarantee the possibility of association with a trusted data supplier in a process of obtaining data. For example, the Oracle™ platform may be associated with data suppliers, such as a government, public institutions (e.g., a port, a train, and aviation), and an exchange. Furthermore, the Oracle™ platform may be associated with programs (e.g., Google calendar and Microformat) that are widely used by common users, and may use transaction information that is generated in various applications in an SC form.

Furthermore, the Oracle™ platform according to the present disclosure may support a structure for connecting and using Oracle™ in an application programming interface (API) gateway form for data association for a digital-based service. For example, the Oracle™ platform may include a function capable of directly associating serverless functions (e.g., Lambda and database transaction) with a condition for an SC.

Figure 3:
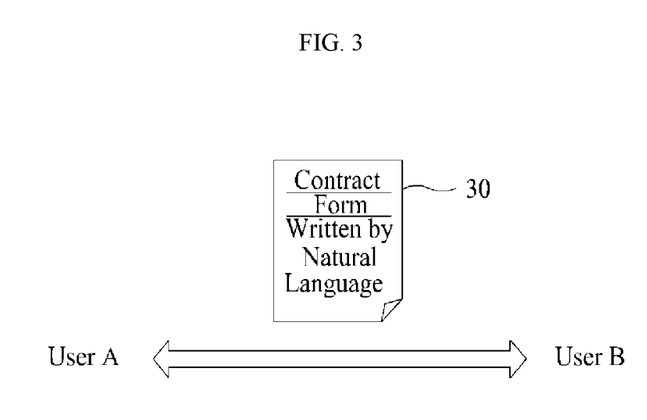
FIG. 3 is a diagram for describing a common contract situation.
Figure 4:
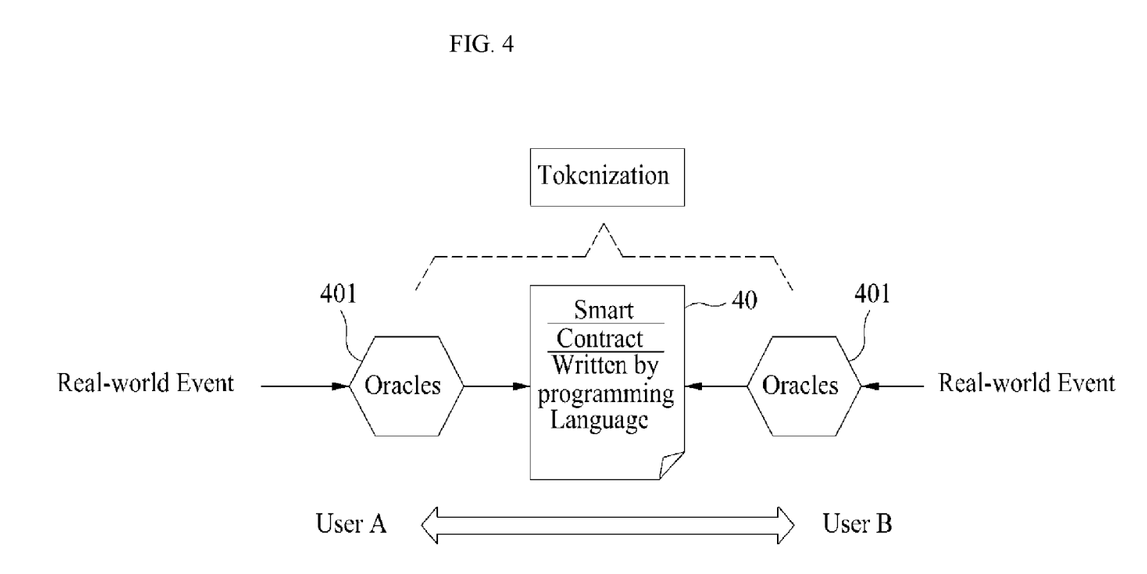
FIG. 4 is a diagram for describing a smart contract-based contract situation in an embodiment of the present disclosure.

FIG. 3 is an exemplary diagram for describing a common contract. FIG. 4 is a diagram for describing an SC-based contract.

Referring to FIG. 3, there is a contract 30 for transactions between a user A and a user B. In this case, the contract 30 is a document written in a natural language. If an issue occurs between interested parties when the contract is fulfilled and verified, a third party institution for arbitrating the issue is required. Additional costs other than transactions may occur.

Referring to FIG. 4, a contract between the user A and the user B may be generated as an SC 40. The SC 40 that contains the contents of the contract between the user A and the user B is stored in a blockchain. The processing of transactions for the SC may be programmatically performed. All of pieces of information that are interoperated with the SC 40 may be recorded on a ledger of the blockchain for trust, and may also be managed in a non-fungible token (NFT) form.

In a contract environment using the SC 40, the contents of the contract contained in the SC 40 may be conditioned in a programming language, and may be stored in a block of the blockchain. In this case, an Oracle™ system 401 connected to the SC 40 may be constructed.

Figure 5:
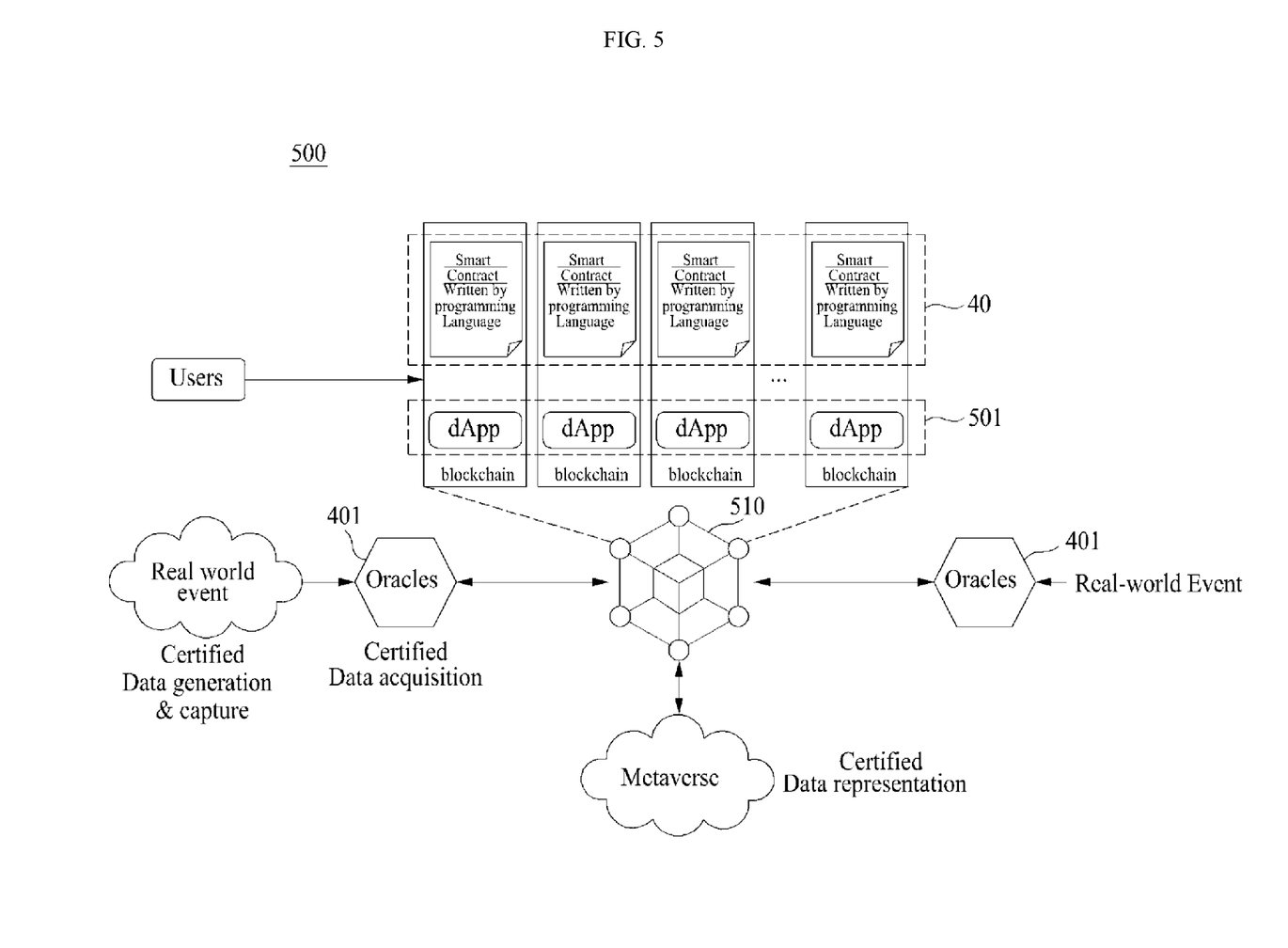
FIG. 5 illustrates architecture of a smart contract management system in an embodiment of the present disclosure.

FIG. 5 illustrates architecture of a smart contract management system in an embodiment of the present disclosure.

Referring to FIG. 5, a smart contract management system 500 according to the present disclosure may manage behaviors related to various contracts online of a user or in a CPS (virtual physical system) and in Metaverse without a third-party trust provider (TTP) by generating and managing the behaviors in the form of the SC 40.

The smart contract management system 500 includes a blockchain system 510. In this case, the blockchain system 510 may include a dAPP layer 501 as an individual blockchain. The contents of the SC 40, which has been written in a programming language suitable for an individual blockchain environment, between the interested parties may be stored in a block of a corresponding blockchain.

In this case, in order for the contract using the SC 40 to be established and fulfilled, there is a need for not only the trust of data that is generated in the real world, but the trust of the Oracle™ system 401 that collects the data.

The smart contract management system 500 may provide trust from a data generation and capture point to a data acquisition point, and may include an interoperation environment with the Oracle™ system 401 that is trustable.

The Oracle™ system 401 may provide 1) a certification function of a data collection apparatus, 2) a trust check/inspection function of the data collection apparatus, 3) a periodic performance verification (testing) function of the data collection apparatus, 4) a network security setting function of the data collection apparatus, and 5) a cryptographic function of data that has been collected by the data collection apparatus, as functions for the real world for trust at a data collection point. The data collection apparatus is an apparatus for obtaining data from a real world system, and may mean all apparatuses that have been trusted by an Oracle™ supplier, that is, that have been certified in Oracle™.

The Oracle™ system 401 verifies the trust of the collected data, and may provide the verified data to the SC 40. The Oracle™ system 401 may use an AI function in addition to a predetermined rule in order to expand the range of data verification. For example, the Oracle™ system 401 may perform the interpretation of an event by using the discriminative model. In this case, since the frequent invoking of the SC 40 may incur costs, the Oracle™ system 401 may provide a function for setting a data transmission cycle based on a mutually agreed contract. Furthermore, the Oracle™ system 401 may provide a certification processing function according to the registration and management of a data collection point and the transmission of data according to a contract, an association function with an service capable of accurate tracking & triggering, such as an API gateway of a digitalized service, and an association function the SC 40 or a blockchain set by a user. In this case, the tracking means a function for tracking real world event information that is collected and transmitted on the Oracle™ system 401. The triggering means a function for associating a specific task with a predetermined event or an event that satisfies a specific condition.

All subjects who participate in a contract through the aforementioned functions can trust not only the contents of the contract, but the Oracle™ system 401 that will trigger a condition for the corresponding contract.

Figure 6:
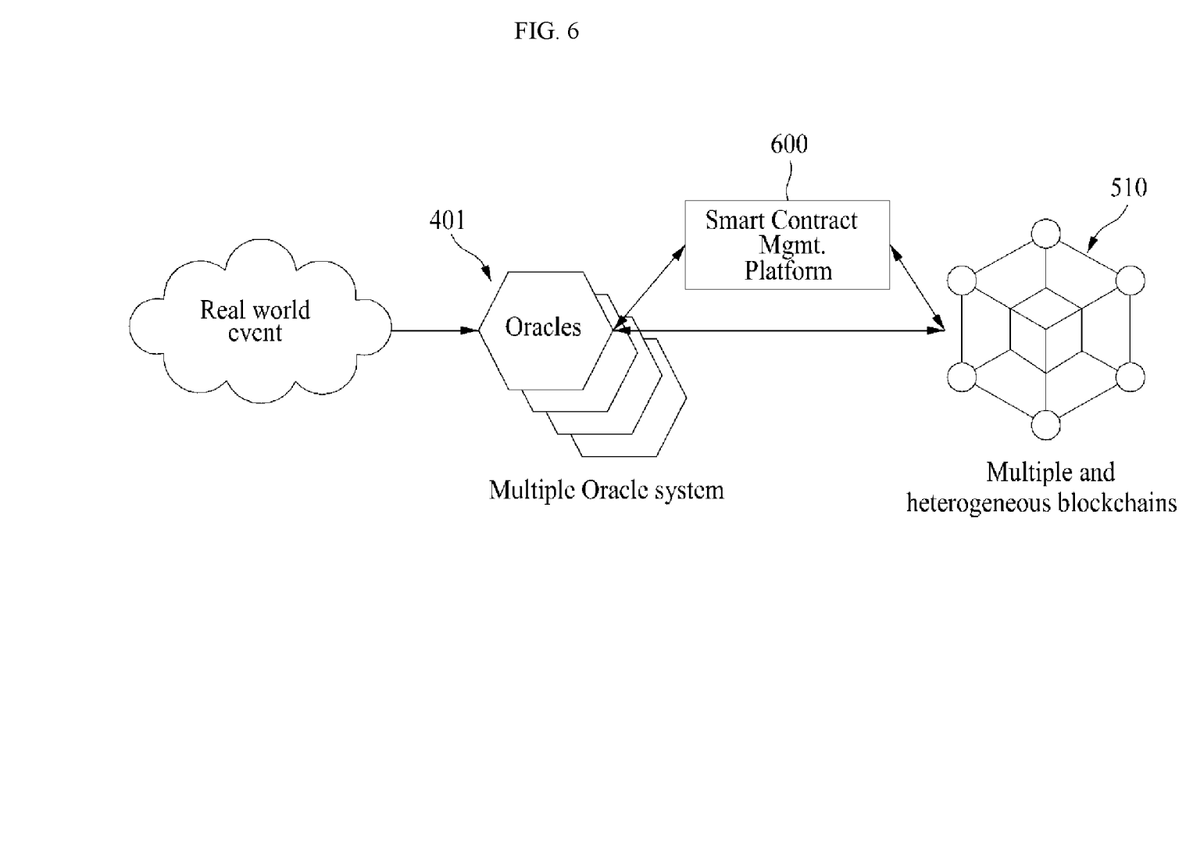
FIG. 6 is a diagram for describing an SC management platform for designating and managing an Oracle™ system in an embodiment of the present disclosure.

Referring to FIG. 6, the smart contract management system 500 according to the present disclosure includes an SC management platform 600 for designating and managing the Oracle™ system 401 that is trustable with respect to the SC 40. The SC management platform 600 may provide a management environment between multiple Oracle™ systems 401 that are required for an SC-based contract environment and multiple and heterogeneous blockchain systems 510.

The Oracle™ system 401, the blockchain system 510, and the SC management platform 600, that is, components included in the smart contract management system 500 according to the present disclosure, may be implemented by the computer device 200 in FIG. 2.

Figure 7:
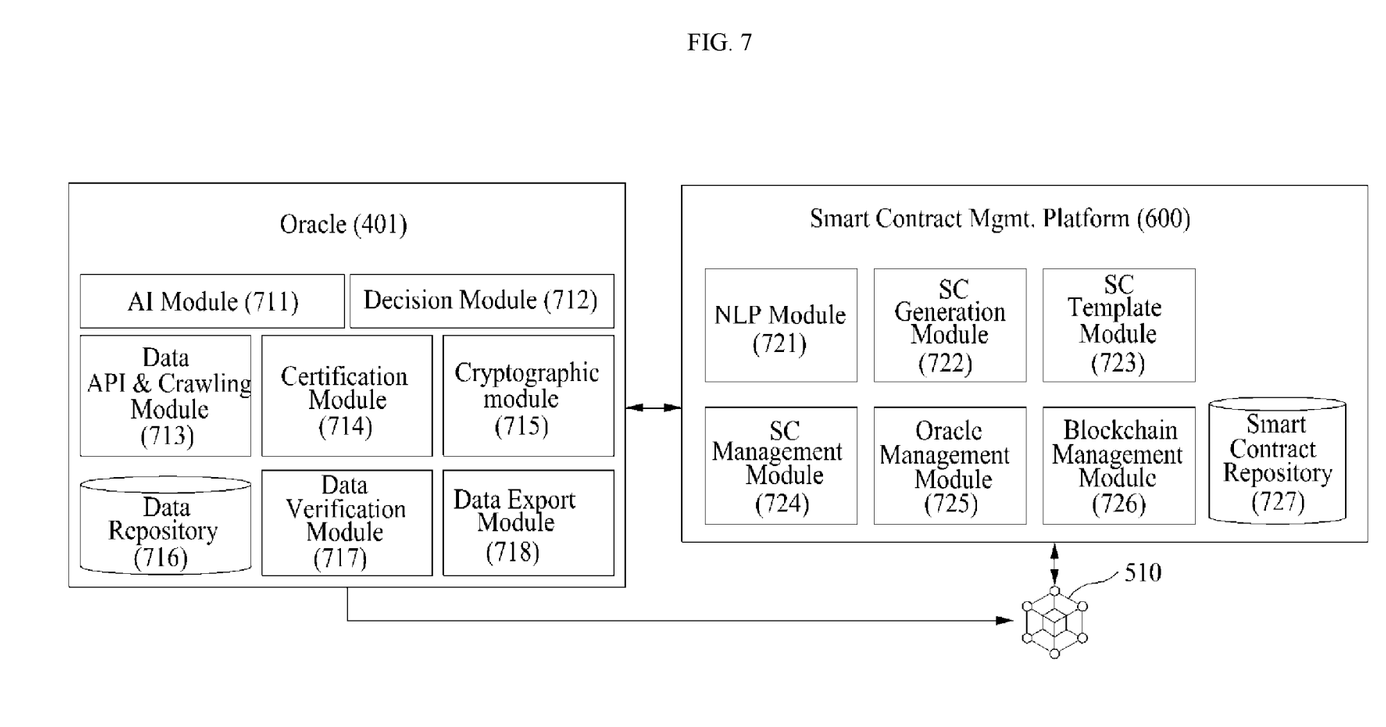
FIG. 7 is a diagram for describing detailed components of the Oracle™ system and the SC management platform in an embodiment of the present disclosure.

Specifically, as illustrated in FIG. 7, the Oracle™ system 401 may include an AI module 711, a decision module 712, a data API & crawling module 713, a certification module 714, a cryptographic module 715, a data repository 716, a data verification module 717, and a data export module 718.

The AI module 711 is a module for learning and determining logic for determining real world information based on AI. In order to understand the meaning of the real world information, a tool or application for separate interpretation is required. The limitation of interpretation based on a rule may be solved by using the AI module 711. In a process for determining an input corresponding to the real world information, the AI module 711 may be used based on the consent of a contract owner. When input data is determined, for example, if real world information is input in a natural language and needs to be changed into digital information, the input data can be automatically processed through the AI module 711 so that the input data can be changed without the intervention of a person. In this case, the AI module 711 may use the discriminative model having an AI model form, which has been specified for discrimination. The AI module 711 corresponds to a function for deriving the results of learning that has been accumulated with respect to situations that are difficult to be previously determined case by case, and may be used to determine various phenomena or events of the natural system. For example, two speakers may request the generation of the SC 40 through a direct command during a spoken dialogue. The AI module 711 may generate the SC 40 with respect to mention related to a contract by interpreting the meaning of dialogue contents between the two persons. In the present embodiment, in order to avoid the ambiguity of NLP, the interpretation of real world information may be performed by using the AI module 711. Accordingly, changed to verified data may be applied as an input value. In other words, the AI module 711 may be used based on selection for whether to use changed to verified data as an input value for the generation of the SC 40 of a user.

The decision module 712 provides a function for controlling an output value of data that is collected by the Oracle™ system 401. The decision module 712 is used to control a data value to a level in which the data value can be determined upon invoking of the SC 40. A pre-defined module is used as corresponding determination logic, or the determination logic may be added and updated in response to a request from a user. The decision module 712 may pre-process a value that is collected in the real world by using AI when the value is an image or a natural language, and may convert the value into a value which may be easily determined like a code on the SC 40 upon invoking of the SC 40 on Oracle™. For example, assuming that there is the SC intended to control or determine a report situation for a degree of congestion in a specific space, when a situation on the ground, which is collected through closed circuit television (CCTV), is analyzed through AI and the density of users is determined based on the situation, the density of the users may be provided as a situation analysis result value (e.g., values corresponding to free, normal, crowded, very crowded, and forced dissolution) so that the density of the users can be predefined or can be used in a form in which the density of the users can be commonly distinguished.

The data API & crawling module 713 may provide a data API function for reading data while interoperating a real world system and a data crawling function for crawling data, that is, a specific target based on a request from a user. The real world system may include a system in which a user behavior related to an actual contract, such as service online or a CPS, and Metaverse, and all targets capable of collecting real world information like various sensor devices, such as the IoT. The data crawling function is used when specific data needs to be read and processed, and may select a crawling target and perform a corresponding task on the crawling target, in response to a request from a user.

The certification module 714 provides a function for certifying data (i.e., data that is collected by the data API & crawling module 713) through the Oracle™ system 401 if the data the source or origin of which can be identified.

The cryptographic module 715 may provide a cryptographic function for data that are transmitted and received through the Oracle™ system 401. The cryptographic module 715 may also provide a management function, such as a corresponding cryptographic key, if real data has been encrypted in order to improve the trust of a data supplier upon interoperation with the real data.

The data repository 716 provides a function for storing and managing raw data that is collected for the activities of the Oracle™ system 401. The data repository 716 may store and manage original data and pre-processed data to be provided to the SC 40. Data that has been used for the execution of the SC 40 may be managed for a long period of time through separate storage. The data repository 716 may operate based on previous setting or according to a contract between the SC 40 and the Oracle™ system 401. Furthermore, the data repository 716 may store and manage data for the data learning of the Oracle™ system 401 itself, such as the AI module 711.

The data verification module 717 is a module for providing trust verification for data that is received by the Oracle™ system 401. The data verification module 717 may perform a certification procedure in accordance with a verification method that is set for each individual connection point, and may also support certification having a form associated with a 3r d party service. The data verification module 717 may perform verification through communication with a data transmission side, and may also verify data by using an evaluation method using AI based on a correlation between collected data according to an embodiment.

The data export module 718 is a module for outputting, to a blockchain, a result value of data that has been processed through the Oracle™ system 401. The data export module 718 may provide a function capable of controlling and adjusting an output value based on characteristics of a blockchain network in which the SC 40 is executed. The Oracle™ system 401 is responsible for transferring a result value to the SCs 40 that operate in various blockchains having a common form. In order for a value that is collected on Oracle™ to be transferred to the SCs 40 that are present in various blockchains, the value is provided in accordance with characteristics of a blockchain network in which each SC 40 operates. Data may be transferred based on protocol specifications with which a node of a substantially individual blockchain network interoperate.

As illustrated in FIG. 7, the SC management platform 600 may include an NLP module 721, an SC generation module 722, an SC template module 723, an SC management module 724, an Oracle™ management module 725, a blockchain management module 726, and an SC repository 727.

The NLP module 721 provides a function for supporting the generation of an SC based on a natural language. The NLP module 721 provides a function for converting an input into a code on a contract and handling the input, if the input is performed based on the natural language in an external service, that is, a real world system.

The SC generation module 722 may receive request information for the generation of an SC directly from an individual service or through the Oracle™ system 401, when the individual service requests the generation of then SC. In this case, the SC generation module 722 may generate the SC based on received contents.

The SC template module 723 provides a function capable of managing and easily using SC types that have been previously generated and used, in a template form. The SC template module 723 may previously generate and manage a template from a user or service provider aspect, and may determine whether to share and use a corresponding template at corresponding timing at which an SC is generated.

The SC management module 724 plays a role of managing overall information, such as the generation, operation (or execution) and discarding of an SC. The SC management module 724 may manage the provisioning of the SC 40 in association with the blockchain system 510, if necessary. The SC management module 724 may discard and process by performing verification from an SC owner so that separate discarding information is generated, when discarding the SC 40. When the SC 40 is discarded, a record on a separate ledger may be performed. If costs attributable to a corresponding behavior occur, the SC management module 724 may pay and manage the costs.

The Oracle™ management module 725 provides a function for managing the Oracle™ system 401 that interoperates with the SC 40. The Oracle™ management module 725 may determine whether to use corresponding Oracle™ by monitoring service quality according to the use of the Oracle™ system 401. The Oracle™ management module 725 may use service performance and state information (e.g., a health status) of the Oracle™ system 401 as basic information, may evaluate service stability by considering a response, delay, or an error rate, and may determine a recommendation to whether to use the Oracle™ system 401 or block the use of the Oracle™ system 401 based on the evaluated service stability.

The blockchain management module 726 is a module for managing information on blockchain nodes that are managed by the SCs 40 within the blockchain system 510. The blockchain management module 726 provides a function for managing and monitoring nodes in which the SC 40 operates, based on the requirements or setting of a user. Furthermore, the blockchain management module 726 is responsible for a backup function for error processing attributable to the instability of a blockchain node upon data input/output in the Oracle™ system 401. For example, the blockchain management module 726 may record and manage information on an impossible operation of the SC 40 if the SC 40 cannot operate due to an error in a corresponding blockchain node upon data input in the Oracle™ system 401.

The SC repository 727 provides a storage space in which the SC 40 is managed, and also provides a role to store and manage original data of the SC 40, if necessary, such as the selection of a user.

Figure 8:
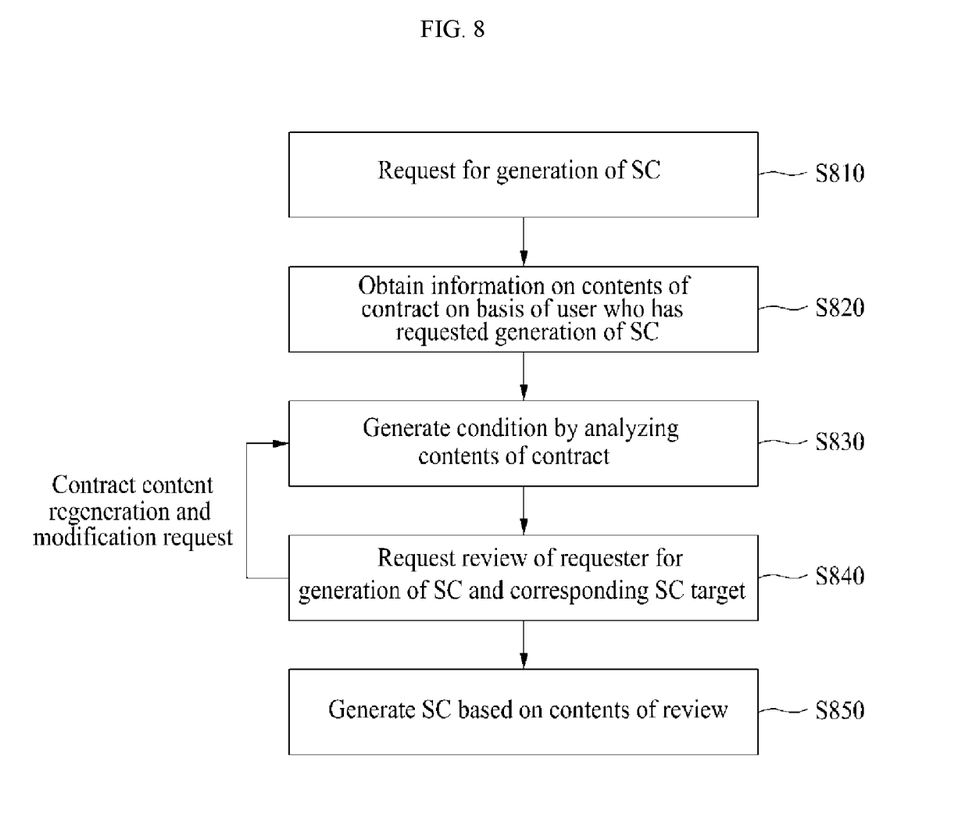
FIG. 8 is a flowchart illustrating an example of a process of generating an SC in an embodiment of the present disclosure.

FIG. 8 is a flowchart illustrating an example of a process of generating an SC in an embodiment of the present disclosure. The process of generating an SC may be performed in the SC management platform 600.

Referring to FIG. 8, in step S810, the SC management platform 600 may receive a request for the generation of an SC from a user, from a user device that is a real world system. If a condition for a contract form, such as a specific agreement, is required for text (including a chat) or voice-based communication in an online or offline environment in which a dialogue is performed between users, the condition may be generated as the SC 40. In the case of offline, there may be provided notification that a contract for corresponding dialogue contents is generated through a separate device, such as a mobile device or an AI speaker capable of interoperation. In the case of an online environment, text or speaking contents of a user may be written through a separate user interface/user experience (UI/UX), and the SC 40 that is being generated may be indicated. Furthermore, in the case of a Metaverse environment, a contract for corresponding contents, which is being generated, may be indicated through a UI in an agent, and may be provided in a form in which a surrounding agent is notified of the contract. In the case of an online environment, a contract may be generated from timing at which tracking is possible by using digital characteristics.

In step S820, the SC management platform 600 may obtain information on the contents of the contract on the basis of a user who has requested the generation of the SC. For example, in the case of a message having a text form on the basis of a requester for the generation of an SC, the SC management platform 600 may obtain basic contents of a contract by capturing the corresponding contents. As another example, in the case of voice-based speaking on the basis of a requester for the generation of an SC, the SC management platform 600 may obtain basic contents of a contract through speech to text (STT) for the corresponding contents.

In step S830, the SC management platform 600 may generate a condition by analyzing the contents of the contract obtained in step S820. AI may be used to analyze the contents of the contract and recognize the contents as a condition. AI may discriminate the condition from information that is provided by a user, and may substitute the condition with a programming conditional sentence. The SC 40 that has been designed through AI may be generated in a diagram form so that the SC can be easily understood by users. A value for each case may be presented as an example. Information on the contents of the contract may be constructed in an animation form so that the information can be visually understood, and may be generated in various forms in which the information can be perceived by a user more easily.

In step S840, the SC management platform 600 may request the review of the requester for the generation of the SC and an SC target who participates in the SC. In the case of the generated SC 40, a generation requester and a corresponding target may be selected, and may be requested to review the SC. In this case, the SC target may determine whether to simply review the SC 40 or whether to directly participate in the SC 40 as a target. In the case of the generated SC 40, the SC 40 may be destroyed if a target does not participate in the review of the SC within a time that has been mentioned by a requester for the generation of the SC. The period in which a corresponding SC 40 is generated may be increased due to a request from an SC target. The SC target may correspond to an AI-based agent in addition to a person. For example, if a user files a complaint in a process of using a specific service in a Metaverse environment, a contract may be generated between a corresponding user agent and a service supply agent of the corresponding Metaverse. For example, when a situation, such as a service error or suspension, occurs during the playing of a user on a specific Metaverse, the corresponding service agent and the user may generate a part for a reward (e.g., a future additional use time, a coupon, or a refund) in a contract form. In this case, an agent of a Metaverse service or space may have a related function or may transfer a corresponding request to a higher authority person or may be approved by a higher authority person.

In step S850, the SC management platform 600 may generate the SC 40 based on the contents reviewed in step S840. The SC 40 may be generated with respect to only a user who has been consented based on the review of a user who is involved in the generation of the contract. Whether the user has been consented may be written through separate signing. In this case, a main network (i.e., a blockchain network in which the SC 40 operates) that generates the SC 40 and an interoperation Oracle™ may be set. In the case of online, information that is provided by a service supplier of the corresponding online may be set as a basic value. For example, if a conference call service, such as ZOOM, is used, the corresponding service may be executed in an associated blockchain virtual machine (VM). If a user designates a specific blockchain-based VM service, the SC 40 may be posted through the specific blockchain-based VM service. In this case, API association information for Oracle™ interoperation and triggering interoperation may be mutually shared. A provider with which corresponding information does not interoperate may be notified that the posting of the SC 40 is impossible.

For example, an environment in which a trust-based contract is used in Metaverse is as follows.

A contract may be performed through voice communication or a simple agreement between users in a Metaverse environment. For example, in operating a painting class in Metaverse, if a new user inquires the participation of the class, a special condition may be provided to the new user. If an additional class participation time is to be provided to the user who has inquired the participation of the class, a contract may be easily generated by only a voice command, or the existing condition for the contract may be updated and the contract may be fulfilled based on the updated condition.

As another example, if item transactions are to be performed between game players in Metaverse, previous transaction conditions may be mutually posted, the previous transaction conditions may be registered as a condition for the contract, and a contract for the corresponding transactions may be fulfilled at mutual consent timing.

Figure 9:
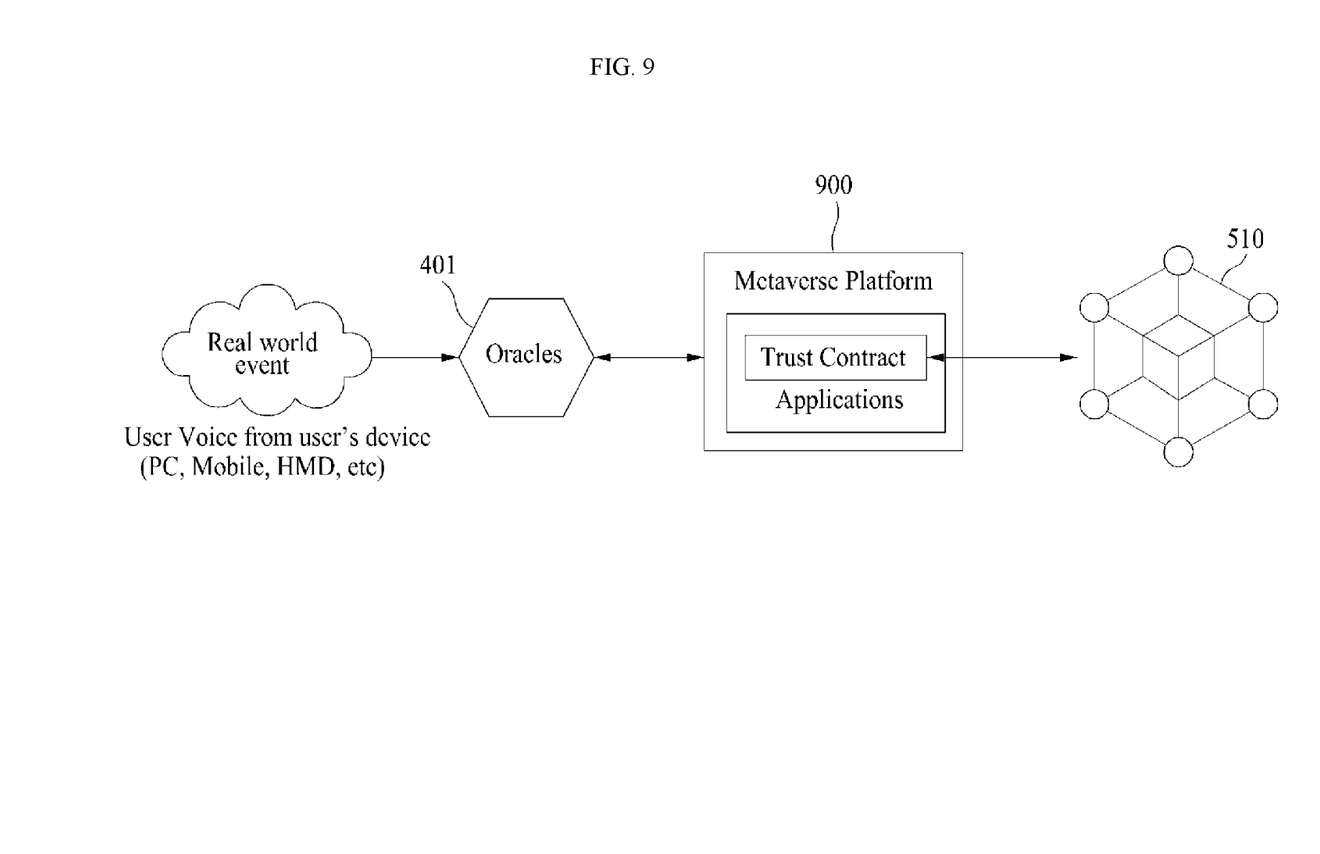
FIG. 9 illustrates an example of a virtual physical system association scenario for association between Metaverse and real world information in an embodiment of the present disclosure.

FIG. 9 illustrates an example of a virtual physical system association scenario for association between Metaverse and real world information in an embodiment of the present disclosure.

Referring to FIG. 9, the smart contract management system 500 may identify information of a corresponding user with respect to a user input at timing at which a contract is generated, through the Oracle™ system 401. The Oracle™ system 401 may perform user certification by using identification information, such as the UUID of a device that the user now accesses. In the case of Metaverse, whether an agent is an agent certified by a user and information (if AI is being operated, this may need to be exceptionally processed other than a special case) on which an actual user has been connected may be identified. If a voice is used, user certification may be performed through a preset gesture or the confirmation of a sentence in order to identify a user.

Furthermore, in the Metaverse platform 900 associated with the SC management platform 600, if the API trigger side is connected to a contract, the API trigger side requests information capable of certifying the trust of a user from the Oracle™ system 401. The Oracle™ system 401 may construct information required for the requirements of the contract in an instant form, and may transfer the information to a real world system (i.e., a real-world event subject side). A user terminal that generates data for a real world event may perform the construction of a system for the contract, the collection of system information, and a related cryptographic function, based on requirements received from the Oracle™ system 401.

Requirements for constructing a trusted contract may include 1) identification information of a device connected to an agent, 2) unique interface information of a data generation or collection device, 3) user certification information (e.g., a session or a key) connected to an agent, and 4) time information (a check time, such as universal time coordinated (UTC)). In this case, the user certification information may be differentially requested from simple certification information to key information in response to a trust request. According to an embodiment, signing information of a user may be used. Furthermore, the time information may include current time information of a terminal, driving time information of an application within Metaverse, and time synchronization information between the terminal and the Oracle™ system 401.

As described above, according to embodiments of the present disclosure, a smart contract can be used as a base technology for a mutual agreement between members of blockchain-based DAO, through the technology for generating a smart contract of a user more easily and managing the smart contract on a blockchain and the technology for designating and managing Oracle™ for connecting trusted data to the smart contract.

The aforementioned apparatus may be implemented as a hardware component, a software component and/or a combination of a hardware component and a software component. For example, the device and component described in the embodiments may be implemented using a processor, a controller, an arithmetic logic unit (ALU), a digital signal processor, a microcomputer, a field programmable gate array (FPGA), a programmable logic unit (PLU), a microprocessor, or one or more general-purpose computers or special-purpose computers, such as any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems connected over a network and may be stored or executed in a distributed manner. The software and the data may be stored in one or more computer-readable recording media.

The method according to an embodiment may be implemented in the form of a program instruction executable by various computer means, and may be stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and ones configured to store a program command, including ROM, RAM, and a flash memory. Furthermore, examples of another medium may include an app store in which apps are distributed, a site in which other various pieces of software are supplied or distributed, and recording media and/or storage media that are managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned components, such as a system, a structure, a device, and a circuit, are coupled or combined in a form different from that of the described method or replaced or substituted with other components or equivalents thereof.

Accordingly, other implementations, other embodiments, and the equivalents of the claims fall within the scope of the claims.

The embodiments of the disclosure in which an exclusive property or privilege is claimed are defined as follows:

1. A method being performed by a computer device including a smart contract management platform, the method comprising:
    obtaining, by at least one processor included in the computer device in a dialogue environment between a first agent of a user and a second agent on a Metaverse environment, contents related to a contract based on conversations between the first agent and the second agent at user request timing;
    generating, by the at least one processor, at least one condition associated with the contract based on an analysis for the obtained contents related to the contract;
    generating, by the at least one processor, a smart contract based on the contents related to the contract and the generated condition;
    requesting, by the at least one processor, a review for the generated smart contract to the first agent and the second agent; and
    completing, by the at least one processor, the generation of the smart contract, and storing, by the at least one processor, the smart contract in a blockchain;
    wherein the generating the smart contract comprises configuring the smart contract in a visually understandable form for the user using an artificial intelligence (AI) model;
    wherein the obtaining comprises verifying the contents related to the contract through interoperation with a computing system providing a computing service, and the verifying comprises receiving, from the computing system, a result of user certification for the user who inputs or utters an input from the first agent included in the conversations;
    wherein a template form corresponding to each of a plurality of contract types is stored and managed in a database associated with a template module of the smart contract management platform;
    wherein generating the smart contract comprises automatically generating the smart contract in a selected template form corresponding to a contract type of the contents related to the contract;
    wherein storing the smart contract comprises storing the smart contract in a blockchain designated by the user or a blockchain associated with the dialogue environment;
    wherein the user certification for the user is performed based on identification information of a device of the user and a determination that a preset gesture or a preset sentence for the user certification is received from the user;
    wherein the second agent is an agent of service provider on the Metaverse environment; and
    wherein the method further comprises, in response to receiving information on a complaint of the user in the Metaverse environment, automatically initiating a process for generating the smart contract between the first agent and the second agent, the condition including at least one of a service error occurrence in a service within the Metaverse environment or a suspension occurrence in the service, and the contents related to the contract including a reward that the first agent is able to acquire when the condition is met and is configured to be used in the Metaverse environment.

2. The method of claim 1, wherein generating the smart contract comprises converting the contents related to the contract in a programmatic form through natural language processing (NLP).

3. The method of claim 1, further comprising managing and monitoring, by the at least one processor, a blockchain node in which the smart contract has been stored, wherein managing and monitoring the blockchain comprises recording error information of the blockchain node on the smart contract.

4. The method of claim 1, wherein verifying the contents related to the contract comprises reading the contents related to the contract from a real world system of the dialogue environment through at least one of a data application programming interface (API) and data crawling.

5. The method of claim 1, wherein verifying the contents related to the contract comprises providing at least one of a certification function for data that is read through the computing system, a cryptographic function for data that are transmitted and received through the computing system, a trust verification function for data that is received through the computing system, and a network security setting function between a data collection point and the computing system, as a function for a trust of the data collection point.

6. The method of claim 1, further comprising managing, by the at least one processor, the computing system that interoperates with the smart contract, wherein managing the computing system comprises monitoring service quality according to a use of the computing system and determining whether to use the computing system based on a result of the monitoring.

7. A computer program stored in a computer-readable recording medium in order to execute the method according to claim 1 in a computer device.

8. A computer device including a smart contract management platform, the computer device further comprising:
    at least one processor configured to execute computer-readable instructions included in memory, wherein the at least one processor processes:
        obtaining, in a dialogue environment between a first agent of a user and a second agent on a Metaverse environment, contents related to a contract based on conversations between the first agent and the second agent at user request timing;

generating at least one condition associated with the contract based on an analysis for the obtained contents related to the contract;

generating a smart contract based on the contents related to the contract and the general condition;

requesting a review for the generated smart contract to the first agent and the second agent; and completing the generation of the smart contract; and storing the smart contract in a blockchain;

wherein the generating the smart contract comprises configuring the smart contract in a visually understandable form for the user using an artificial intelligence (AI) model;

wherein the obtaining comprises verifying the contents related to the contract through interoperation with a computing system providing a computing service, and the verifying comprises receiving, from the computing system, a result of user certification for the user who inputs or utters an input from the first agent included in the conversations;

wherein a template form corresponding to each of a plurality of contract types is stored and managed in a database associated with a template module of the smart contract management platform;

wherein generating the smart contract comprises automatically generating the smart contract in a selected template form corresponding to a contract type of the contents related to the contract;

wherein storing the smart contract comprises storing the smart contract in a blockchain designated by the user or a blockchain associated with the dialogue environment;

wherein the user certification for the user is performed based on identification information of a device of the user and a determination that a preset gesture or a preset sentence for the user certification is received from the user;

wherein the second agent is an agent of service provider on the Metaverse environment; and wherein the at least one processor further processes, in response to receiving information on a complaint of the user in the Metaverse environment; automatically initiating a process for generating the smart contract between the first agent and the second agent, the condition including at least one of a service error occurrence in a service within the Metaverse environment or a suspension occurrence in the service, and the contents related to the contract including a reward that the first agent is able to acquire when the condition is met and configured to be used in the Metaverse environment.

9. The computer device of claim 8, wherein the at least one processor converts the contents related to the contract in a programmatic form through natural language processing (NLP).

10. The computer device of claim 8, wherein the at least one processor manages and monitors a blockchain node in which the smart contract has been stored, and records error information of the blockchain node on the smart contract.

11. The computer device of claim 8, wherein the at least one processor reads the contents related to the contract from a real world system of the dialogue environment through at least one of a data application programming interface (API) and data crawling.

12. The computer device of claim 8, wherein the at least one processor provides at least one of a certification function for data that is read through the computing system, a cryptographic function for data that are transmitted and received through the computing system, a trust verification function for data that is received through the computing system, and a network security setting function between a data collection point and the computing system, as a function for a trust of the data collection point.

* * * * *